(12) United States Patent
Betourney et al.

(10) Patent No.: US 10,045,422 B2
(45) Date of Patent: Aug. 7, 2018

(54) SYSTEM AND METHOD FOR LIGHT-BASED ACTIVATION OF AN OCCUPANCY SENSOR WIRELESS TRANSCEIVER

(71) Applicant: LEVITON MANUFACTURING CO., INC., Melville, NY (US)

(72) Inventors: Jason Betourney, Portland, OR (US); Nathaniel Morrison, Tigard, OR (US)

(73) Assignee: LEVITON MANUFACTURING CO., INC., Melville, NY (US)

(*) Notice: Subject to any disclaimer, the term of this patent is extended or adjusted under 35 U.S.C. 154(b) by 0 days.

(21) Appl. No.: 15/378,688

(22) Filed: Dec. 14, 2016

(65) Prior Publication Data

US 2017/0245346 A1   Aug. 24, 2017

Related U.S. Application Data

(60) Provisional application No. 62/299,284, filed on Feb. 24, 2016.

(51) Int. Cl.
　　*H05B 37/02*　　(2006.01)
　　*H05B 37/03*　　(2006.01)
　　*H04B 1/38*　　(2015.01)

(52) U.S. Cl.
　　CPC .......... *H05B 37/0227* (2013.01); *H04B 1/38* (2013.01); *H05B 37/02* (2013.01); *H05B 37/0218* (2013.01); *H05B 37/0272* (2013.01); *H05B 37/03* (2013.01)

(58) Field of Classification Search
　　CPC ............ H05B 37/0272; H05B 37/0227; H05B 37/0218; H05B 37/02; H05B 37/0245; H05B 33/0869; H05B 33/0872; H05B 39/088; H05B 33/0854; Y02B 20/46; Y02B 20/48; Y02B 20/44; H04B 10/116; H04B 10/40

See application file for complete search history.

(56) References Cited

U.S. PATENT DOCUMENTS

| | | | |
|---|---|---|---|
| 7,391,297 B2 | 6/2008 | Cash et al. | |
| 8,446,102 B2* | 5/2013 | Leinen | H05B 37/02 315/209 R |
| 9,095,013 B2* | 7/2015 | Leinen | H05B 37/02 |
| 9,271,375 B2 | 2/2016 | Balasubramanian et al. | |
| 9,532,435 B2* | 12/2016 | Leinen | H05B 37/02 |
| 9,565,741 B2* | 2/2017 | Carberry | H05B 37/02 |
| 9,693,426 B2* | 6/2017 | Van Der Werff | H05B 37/0218 |

(Continued)

OTHER PUBLICATIONS

"LMCT-100 Digital Wireless Configuration Tool," WattStopper, No. 31403, Rev. 04/2010, www.wattstopper.com.

(Continued)

*Primary Examiner* — Vibol Tan

(57) ABSTRACT

An occupancy sensor preferably includes an occupancy sensing element configured to detect moving objects within an area of coverage, and a wireless transceiver configured to facilitate wireless coupling of the occupancy sensor to a remote device to facilitate remote wireless configuration and/or commissioning of the occupancy sensor. The wireless transceiver can be configured to be activated in response to a light sensing element of the occupancy sensor being exposed to one or more flashes of light. The wireless transceiver can be de-activated after configuration.

18 Claims, 4 Drawing Sheets

(56) References Cited

U.S. PATENT DOCUMENTS

| | | | |
|---|---|---|---|
| 2011/0312286 A1* | 12/2011 | Lin | H04W 52/0254 455/73 |
| 2012/0306621 A1* | 12/2012 | Muthu | H05B 37/0272 340/8.1 |
| 2013/0010018 A1 | 1/2013 | Economy | |
| 2013/0016079 A1* | 1/2013 | Wang | G09G 3/3406 345/207 |
| 2013/0026947 A1 | 1/2013 | Economy et al. | |
| 2013/0030589 A1 | 1/2013 | Pessina et al. | |
| 2013/0229112 A1* | 9/2013 | Van Der Werff | H05B 37/0245 315/151 |
| 2014/0239817 A1* | 8/2014 | Leinen | H05B 37/02 315/152 |
| 2014/0375218 A1* | 12/2014 | Leinen | H05B 37/02 315/152 |

OTHER PUBLICATIONS

"EcoSytemTM Programmer", Programming Guide, Jun. 2006 Lutron Electronics Co., Coopersburg, PA.

"Lightwave RF, Dimmer Switch (1 Gang) Model No. JSJSLW400", Instruction Manual, Connect Series, www.lightwaverf.com, Version 2.

"Fixture Integrated Dimming Photosensor", FD-301, WattStopper, Legrand, 08885r2 Jan. 2008, www.wattstopper.com.

"Digital Lighting Management, DLM System Installation Guide," WattStopper, Santa Clara, CA, 10743r, Oct. 2010.

WattStopper, "Digital Lighting Management," Sales411 #SS-116, WattStopper, Santa Clara, CA, SS-116 Mar. 2011 v1.

"LMLS-305 0-10 Volt Dimming Photosensor," Daylighting Sensor, Digital Lighting Management, WattStopper, www.wattstopper.com, Pub. No. 31101 rev. Sep. 2009.

"LMCT-100 Digital Configuration Tool," User Guide, WattStopper, Santa Clara, CA 11614r4, Nov. 2012.

* cited by examiner

SYSTEM AND METHOD FOR LIGHT-BASED ACTIVATION OF AN OCCUPANCY SENSOR WIRELESS TRANSCEIVER

CROSS-REFERENCE TO RELATED APPLICATIONS

This application claims priority to U.S. Provisional Patent Application Ser. No. 62/299,284, filed Feb. 24, 2016, titled "System and Method for Light-Based Activation of an Occupancy Sensor Wireless Transceiver," the entirety of which application is incorporated by reference herein.

FIELD OF THE DISCLOSURE

The present disclosure relates generally to occupancy sensing and lighting systems, and more particularly to an improved system and method for controlling (e.g., activating and, optionally, deactivating) a wireless transceiver of a wireless occupancy sensor as part of a wireless configuration arrangement.

BACKGROUND OF THE DISCLOSURE

In recent years the prevalence of occupancy sensors in lighting systems has increased. Occupancy sensors are designed to save energy in lighting systems by detecting the presence or absence of a moving object in an area of coverage and switching a light source on or off depending on such presence or absence. For example, when motion is detected within an area of coverage of an occupancy sensor, a light source that is associated with the occupancy sensor is turned on. Alternatively, when motion is not detected in the area of coverage, indicating that the area of coverage is not occupied, the light source is turned off after a predetermined period of time. Occupancy sensors thus provide electrical energy savings by automating the functions of a light switch or other mechanism that controls the supply of electrical power to a light source.

Modern occupancy sensors often include enhanced functionality, with configuration features that can only be accessed and adjusted by a user having direct physical access to the sensor. For sensors positioned in elevated locations this is inconvenient and can pose a safety hazard as it requires the user to be on a ladder in order to access the sensor. To avoid this, some occupancy sensors have been designed to be remotely configurable so that a user standing on the ground can configure the occupancy sensor positioned on a ceiling, high wall, or the like.

Remote configuration can be achieved using a wireless device capable of establishing a wireless connection with the occupancy sensor. Once the wireless connection to the occupancy sensors has been established, an installer or system operator can use the remote device to configure one or more operational parameters of the occupancy sensor.

After the configuration parameters of the occupancy sensor have been set or adjusted, the wireless transceiver of the occupancy sensor can be deactivated to prevent tampering (e.g., unauthorized changes to settings) and to mitigate screen clutter on unrelated remote wireless devices (e.g., smartphones, tablets, laptops, etc.) that might otherwise detect and list the occupancy sensor in a wireless connection menu. Such deactivation can be performed manually (e.g., via a button press on the sensor) or automatically (e.g., via a predetermined period of time or a timeout period).

As will be appreciated, it may be desirable at some later time to reactivate the wireless transceiver of the occupancy sensor in order to facilitate reconfiguration and/or recommissioning of the occupancy sensor. With current occupancy sensors, however, reactivation of the wireless transceiver cannot be achieved remotely, but instead must be performed by a user pressing a reset button on the occupancy sensor or by disconnecting the occupancy sensor from its power source, waiting a predetermined period of time (e.g., 10 seconds), and reconnecting the occupancy sensor to its power source.

As mentioned, since occupancy sensors are often installed in ceilings and in other locations that are difficult to access, it therefore necessary for a system operator or technician to employ a ladder, lift, or other assistive device in order to reactivate an occupancy sensor's wireless transceiver. As mentioned, this can be inconvenient and can pose a safety hazard as it requires the user to be on a ladder in order to access the sensor. It can also be labor intensive and time consuming for instances in the wireless transceivers of a large number of occupancy sensors are being reactivated.

In view of the foregoing, it would be advantageous to provide a system and method for facilitating remote reactivation of an occupancy sensor's wireless transceiver, thus eliminating the need for a technician to physically access the occupancy sensor. It would further be advantageous to provide such a system and method that require a technician to be in the immediate vicinity of an occupancy sensor (e.g., in the same room) when reactivation is performed in order to prevent remote tampering with the occupancy sensor and to avoid confusion between occupancy sensors in a lighting system.

SUMMARY OF THE DISCLOSURE

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

Disclosed herein is a load control device such as, for example, an occupancy sensor. The sensor may include an occupancy sensing element for detecting an object within an area of coverage; a light sensing element for detecting a light level; a wireless transceiver configured for wireless communication with a remote device; and one or more processors. Each of the processors may be coupled to at least one of the occupancy sensing element, the light sensing element and the wireless transceiver. The processors may be programmed to at least one of activate and deactivate the wireless transceiver when the light sensing element senses a predetermined light signal.

The sensor may include an occupancy sensing element; a light sensing element; a wireless transceiver configured for wireless coupling of the occupancy sensor to a remote device; and one or more processors, each of the processors may be coupled to at least one of the occupancy sensing element, the light sensing element and the wireless transceiver, wherein the one or more processors may be programmed to activate the wireless transceiver when the processor receives signals from the light sensing element indicating that the light sensing element has been exposed to at least one of: (1) a light having a predetermined intensity, and (2) a predetermined set of light pulses.

The load control device may include a light sensing element for detecting a light level; a wireless transceiver configured for wireless communication with a remote device; and one or more processors, each of the one or more processors may be coupled to at least one of the light sensing element and the wireless transceiver, the one or more processors may be programmed to at least one of activate and deactivate the wireless transceiver when the light sensing element senses a predetermined light signal.

The predetermined light signal may include predetermined light pulses. The predetermined light signal may include a predetermined number of light pulses and/or a predetermined frequency of light pulses.

The one or more processors may be programmed to activate the wireless transceiver when the occupancy sensor is powered up. The one or more processors may also be programmed to deactivate the wireless transceiver as a step subsequent to configuration of the occupancy sensor using the remote device. The one or more processors may be a single processor that is coupled to the occupancy sensing element, the light sensing element and the wireless transceiver, the processor being programmed to at least one of activate and deactivate the wireless transceiver when the light sensing element senses a predetermined light signal.

The processors may be programmed to activate the wireless transceiver in response to the light sensing element being exposed to a coded set of flashed light pulses.

The wireless transceiver may be a Bluetooth radio. The sensor may include a status indicator for providing a visual indication when the wireless transceiver is active.

An illustrative method for activating a wireless transceiver is also disclosed herein. One illustrative embodiment may include the steps of receiving, at a light sensing element associated with an occupancy sensor, a light pulse; determining, by a processor associated with the light sensing element, that the received light pulse conforms with at least one of a predetermined light pulse intensity and light pulse sequence; and activating the wireless transceiver of the occupancy sensor when the received light pulse conforms with the predetermined light pulse intensity or the predetermined light pulse sequence.

The method may further include activating a visual status indicator associated with the occupancy sensor, the visual status indicator identifying an active state of the wireless transceiver and/or deactivating the wireless transceiver when the wireless transceiver does not receive a wireless signal within a predetermined time period. Activating the wireless transceiver may include activating the wireless transceiver for a predetermined period of time, at the expiration of which the wireless transceiver is automatically deactivated.

DETAILED DESCRIPTION

Figure 1:
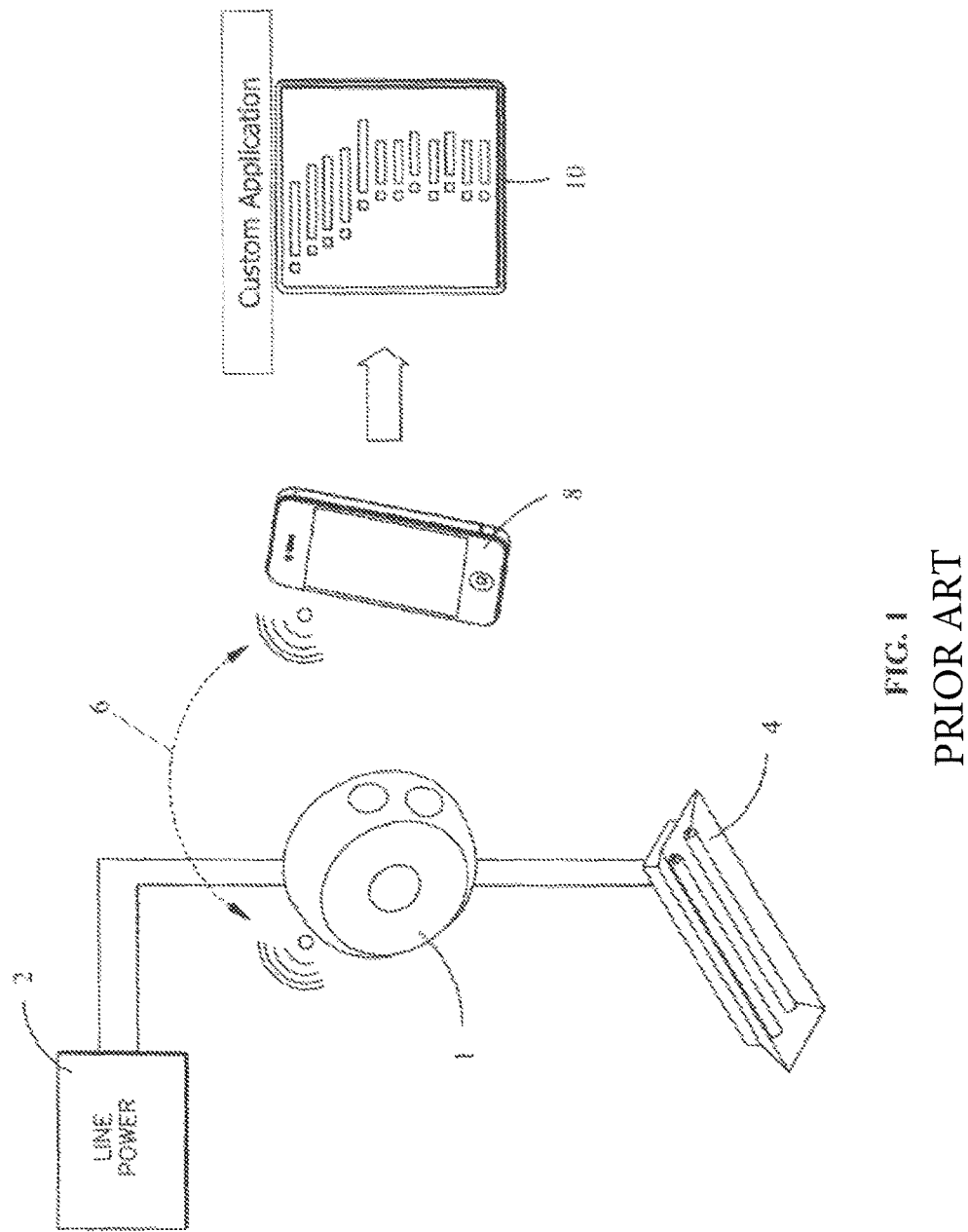
FIG. 1 is a schematic diagram of an exemplary occupancy sensing system according to embodiments of the disclosure.

The present disclosure relates to a system and method for activating and, optionally, deactivating wireless transceivers of occupancy sensors. Advantageously, the system and method may be implemented in a manner that does not require a technician to gain physical access to occupancy sensors in order to update network or configuration settings associated with the occupancy sensors, thereby improving efficiency and reducing labor compared to present systems and methods. While the present disclosure will be described and illustrated in connection with an occupancy sensor, it should be understood that the present disclosure is equally applicable to operate with other load control devices including, for example, switches, dimmers, photocells, room and load control systems, etc.

In some embodiments, the occupancy sensor may be a low voltage sensor and thus may operate in connection with a power pack. Alternatively, the occupancy sensor may be a line voltage sensor and include an internal relay. The low voltage sensor and the power pack may be operatively connected to one another by a cable or other connection.

After an occupancy sensor has been commissioned, preferably via a wireless remote device, the occupancy sensor's wireless transceiver may be deactivated to prevent tampering and to mitigate screen clutter on unrelated wireless devices (e.g., smartphones, tablets, laptops, etc.) that might otherwise detect and list the occupancy sensor in a wireless connection menu. It will be appreciated that communications, commissioning, and configuration of the occupancy sensors can be achieved using any of a variety of devices, such as remote wireless devices including smartphones, tablets, laptops, etc. A description of a non-limiting exemplary description of such communications, commissioning and configuration is disclosed in U.S. Pat. No. 9,271,375 to Balasubramanian et al., titled "System and Method for Occupancy Sensing with Enhanced Functionality," the entirety of which patent is incorporated by reference herein.

In some embodiments, the disclosed occupancy sensor may include an integral light sensing element such as a photocell. Alternatively, the occupancy sensor may include an external light sensing element that is communicatively coupled to the occupancy sensor. As will be described in greater detail later, the light sensing element can be used to activate and/or deactivate the wireless transceiver of the associated occupancy sensor. For example, a technician may use a flashlight or other handheld light source (e.g., a laser pointer) to illuminate the occupancy sensor's light sensing element. A processor coupled to the light sensing element may recognize a received light pulse, a coded set of light pulses or a light intensity and may activate the wireless transceiver of the occupancy sensor. The wireless transceiver may remain activated until the occupancy sensor is reconfigured, or until the wireless transceiver is otherwise deactivated (e.g., via timeout or subsequent light pulse).

The system and method of the present disclosure will now be described more fully with reference to the accompanying drawings, in which preferred embodiments of the system and method are presented. The system and method may, however, be embodied in many different forms and should not be construed as being limited to the embodiments set forth herein. Rather, these embodiments are provided so that this disclosure will be thorough and complete, and will fully convey the scope of the disclosed system and method to those skilled in the art. In the drawings, like numbers refer to like elements throughout unless otherwise noted.

FIG. 1 shows an embodiment of an occupancy sensing arrangement including occupancy sensor 1 having a wireless transceiver for communicating with a remote device to enable the sensor to be remotely configured by a user. The disclosed arrangement provides an advantage over current occupancy sensors which require adjustments to be made manually at the device using buttons, dip-switches, etc. It will be appreciated that in applications where the occupancy sensor is positioned at an elevated location (ceiling, high wall position, etc.) the disclosed occupancy sensor eliminates the need for a user to climb a ladder to make adjustments to the sensor. In addition, a plurality of occupancy sensors can be quickly configured by a user with an appropriate remote device.

In the illustrated embodiment, the occupancy sensor 1 is a line voltage occupancy sensor that receives power from a source of line power 2 and controls at least one load 4 (e.g., a light) in response to a sensed occupancy condition in a monitored space. In the illustrated embodiment, the occupancy sensor 1 includes an integral load control device (i.e., relay) for providing power to the load 4, though it will be appreciated that a power pack may be provided separate from the occupancy sensor. The relay may be coupled to the load 4 and may also be coupled to the source of line power 2 so that the load 4 may be selectively illuminated. For example, the load 4 may be selectively illuminated in response to an occupancy condition sensed by the occupancy sensor 1 or a command from a room controller (not shown). The power pack may provide relay switched power for turning the lighting fixture ON and OFF, along with 1-10 Vdc dimmer control for dimming the load 4 UP and DOWN.

The occupancy sensor 1 may be configured to receive wireless signals 6 from a remote device 8 to perform one or more internal configuration functions of the occupancy sensor. For example, a user can employ the remote device 8 to set one or more configuration and/or operational parameters of the occupancy sensor, as will be described in greater detail below. In some embodiments, the remote device 8 may call a custom application 10 that includes an appropriate interface for enabling a user to remotely configure the wireless occupancy sensor 1 in a desired manner. In non-limiting exemplary embodiments, the remote device 8 may be a smartphone, a tablet, a laptop, etc.

Figure 2:
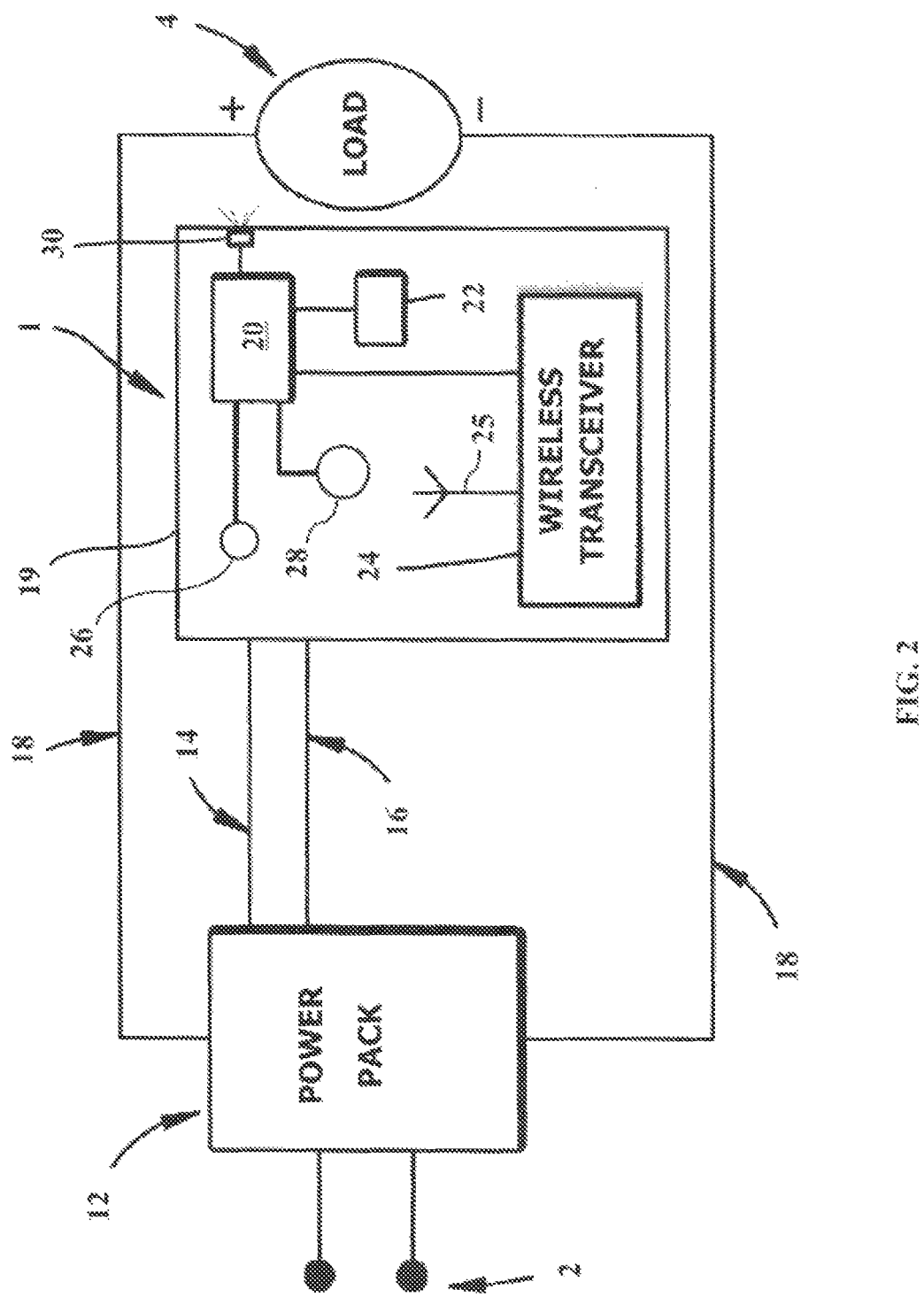
FIG. 2 is a schematic diagram of an exemplary occupancy sensing system according to a further embodiment.

Referring now to FIG. 2, an embodiment of a low voltage occupancy sensor 1 coupled to a power pack 12 via power and communications cables 14, 16 so that the power pack 12 can provide power to components of the occupancy sensor (via the power cable 14) and so that the occupancy sensor 1 can dictate operation of the power pack 12 (via the communications cable 16). Preferably, the occupancy sensor 1 may include a UART connection for messaging between the occupancy sensor 1 and the power pack 12. In the illustrated embodiment, the power pack 12 is coupled to a load 4 via power lines 18. In the illustrated embodiment the load 4 is a lighting element. In non-limiting exemplary embodiments, the occupancy sensor 1, upon sensing an occupancy condition, may instruct the power pack 12 to energize the load 4 via power lines 18. In some embodiments, the power pack 12 may provide relay-switched power along with 1-10 Vdc dimmer control. It will be appreciated, however, that the power pack 12 is optional and that the occupancy sensor 1 may be configured as a line voltage occupancy sensor with an internal relay.

The occupancy sensor 1 may further include an occupancy sensing element 26, a light sensing element 28 such as a photocell, a status indicator such as a light emitting diode (LED) 30 and a processor 20 for controlling one or more configuration and/or operational aspects of the sensor and for commanding and decoding communication signals sent between the occupancy sensor and the power pack 12, and/or between the occupancy sensor and the remote device 8 (FIG. 1). The processor 20 may have local memory 22 associated therewith for storing information including, but not limited to, configuration and operational information transmitted from the remote device 8. The memory 22 may be any of a variety of volatile or non-volatile memory types.

The occupancy sensor 1 may include a wireless transceiver 24 for receiving wireless signals from the remote device 8 and/or the power pack 12 (where the load control device is wireless-enabled). The wireless transceiver 24 may be coupled to the processor 20 to enable the processor to use the received information from the remote device 8 to adjust one or more configuration parameters of the occupancy sensor 1.

In some embodiments, the processor 20 can command the wireless transceiver 24 to transmit signals back to the remote device 8 or other device to provide operational and/or configuration information relating to the sensor 1. In one exemplary non-limiting embodiment, the transceiver 24 may provide an acknowledgement signal to the remote device 8 once a configuration step is completed. It will be appreciated that although the wireless transceiver 24 is illustrated as a single element (i.e., chip), the wireless receiver and transmitter functionality may be provided as separate devices within the occupancy sensor 1.

In some embodiments, the occupancy sensor 1 is hard wired to the other components of the system (power, load control device, load, etc.) to provide powering and signaling of an occupancy condition. In other embodiments, however, the occupancy sensor 1 can be completely wireless and the wireless transceiver 24 may facilitate wireless occupancy signaling to a wireless load control device or other control device. In such embodiments, a separate power source, such as but not limited to, one or more batteries, PV cells, etc., may be used as a primary or back-up source of power to operate the occupancy sensor's circuitry.

In one non-limiting exemplary embodiment, a user may review a list of available Wi-Fi networks on the remote device 8. The name of the occupancy sensor 1 may appear in a screen list of available Wi-Fi options. To interface with a particular occupancy sensor, the user may simply select that sensor from the displayed list, and by entering a password may be connected to the individual occupancy sensor 1. Various configuration options may then be selected and adjusted as desired. In an alternative embodiment the user may open an internet browser on the remote device, whereupon the user will be able to access a web page associated with one or more occupancy sensors. The web page may be a homepage including a plurality of individual pages associated with individual occupancy sensors. The user may connect to the individual occupancy sensors via their associated individual web page. Alternatively, and as previously noted, the user may access an individual occupancy sensor by entering the particular sensor's IP address.

The wireless transceiver 24 may be coupled to an antenna 25 and may use any of a variety of suitable wireless transmission technologies including RF transmission using one of the many standards developed by the Institute of Electrical and Electronic Engineers (IEEE), infrared transmission using a standard from the Infrared Data Association (IrDA), or any other standardized and/or proprietary wireless communication technology. In non-limiting exemplary embodiment, the wireless transmission technology used can be Bluetooth, Bluetooth Low Energy (BLE), ZigBee or Wi-Fi.

The processor 20 may be communicatively coupled to each of a variety of individual components of the occupancy sensor 1 to facilitate control of one or more operational aspects of the sensor. In some embodiments, upon power up of the occupancy sensor 1 from an unpowered state (e.g., upon initial connection of the occupancy sensor 1 to a source of power during installation), the wireless transceiver 24 is automatically active, such as in response to a command from the processor 20, for example. When the wireless transceiver 24 is active, the occupancy sensor 1 may be visible to other wireless devices, such as the remote device 8, and may therefore be available for wireless configuration via the remote device 8. Thus, in an active state, the wireless transceiver 24 can receive wireless messages from the remote device 8, and the processor 20 may take one or more actions based on the received wireless messages. Optionally, the status indicator 30 of the occupancy sensor 1 may be illuminated or may flash in a predetermined pattern when the wireless transceiver 24 is active. The wireless transceiver 24 may remain active for a predetermined period of time (e.g., a predefined number of minutes, hours, or days), or until the occupancy sensor 1 is configured by the remote device 8, or for a predetermined period of time during which no wireless signal is received, or via a command from the remote device 8, after which the wireless transceiver 24 may be automatically deactivated. By deactivating the wireless transceiver 24, the occupancy sensor 1 may be incapable of receiving wireless messages. This may desirably prevent unauthorized access to, and tampering with, one or more settings of the occupancy sensor 1.

It will be appreciated that although the processor 20 is illustrated as a single element (i.e., chip), the device may include multiple processors. For example, the sensor or device may include one or more processors where each of the processors may be coupled to at least one of the occupancy sensing element, the light sensing element and the wireless transceiver. At least one of the processors being programmed to at least one of activate and deactivate the wireless transceiver when the light sensing element senses a predetermined light signal. As such, for example, the sensor or device may include first and second processors where the first processor may be coupled to the occupancy sensing element and the light sensing element, while the second processor may be coupled to the wireless transceiver. Alternatively, the device or sensor may include three or more processors.

As previously mentioned, it may be desirable to reactivate the wireless transceiver 24 after it has been deactivated, for example to facilitate reconfiguration of the occupancy sensor 1 via the remote device 8. Since it is not possible to reactivate the wireless transceiver 24 directly (i.e., via wireless messaging), the wireless transceiver may instead be "indirectly" reactivated using the light sensing element 28. In one embodiment, a technician may employ a flashlight, laser pointer, or other light source to flash a light pulse or a predetermined pattern of light pulses at the light sensing element 28 of the occupancy sensor 1. In one non-limiting exemplary embodiment, the processor 20 may be configured to recognize light flashes (as sensed by the light sensing element 28 connected thereto) as an instruction to reactivate the wireless transceiver 24.

In one non-limiting exemplary embodiment, the processor 20 may be programmed so that when the light sensing element 28 senses a predetermined plurality of light pulses that exceed a predetermined intensity threshold and that are received within a predetermined period of time (e.g., 5 seconds) the processor determines this to mean that the wireless transceiver 24 should be reactivated. A non-limiting exemplary listing of appropriate predetermined patterns that may be used to activate (or deactivate) the wireless transceiver 24 include a predetermined number, frequency, intensity and/or type of light pulses, as well as combinations thereof.

Using a single light flash, or a predetermined (i.e., coded) set of light flashes in a set period of time (for example, 3 flashes within 5 seconds) or a specific type of light pulse to activate the wireless transceiver 24 may avoid inadvertent reactivation of the wireless transceiver, for example, by random flashes (e.g., sun reflections through a window) or by a technician or other personnel inadvertently shining a flashlight or other light source into the light sensing element 28 during routine inspection of a ceiling or a room in which the occupancy sensor 1 is located. As previously mentioned, the status indicator 30 of the occupancy sensor 1 may be illuminated or may flash in a predetermined pattern while the wireless transceiver 24 is active, thereby indicating to a technician that activation was successful, and that the occupancy sensor 1 is ready for commissioning or for other adjustments to its settings. Once activated, the wireless transceiver 24 may remain active for a predetermined period of time (e.g., a predefined number of minutes, hours, or days), or until the occupancy sensor 1 is reconfigured by the remote device 8, or for a predetermined period of time during which no wireless signal is received, or via a command from the remote device 8, after which the wireless transceiver 24 may once again be automatically deactivated.

In some embodiments, the wireless transceiver 24 may remain active until it is manually turned off using the same or different set of light pulses as were used to activate the wireless transceiver. In such instances the processor 20 may monitor the light sensing element 28 and upon receiving signals representative of another set of light pulses sensed by the light sensing element, may command the wireless transceiver 24 to deactivate.

Any of a variety of light pulses, light intensities and/or light types can be used in combination with the light sensing element 28 and processor 20 to activate and/or deactivate the wireless transceiver 24. Any type of light source can be used, as long as it can be sensed by the light sensing element 28. Where the light sensing element 28 is configured to sense light in the visible spectrum, then any light source that operates in the visible spectrum can be used to provide the desired signaling to the occupancy sensor 1 to activate or deactivate the wireless transceiver 24. The benefit of such an arrangement is that the light sensing element 28 of the occupancy sensor can be used for activation and/or deactivation of the wireless transceiver 24, and can also facilitate other functionality such as daylighting functionality, safety lighting functionality, and the like. In alternative embodiments, a light source can be used that does not operate in the visible spectrum. For example, an ultraviolet (UV) or infrared (IR) light source could be used in combination with a light sensing element 28 able to sense the associated light flash and/or pulses from the light source.

The light sensing element 26 of the occupancy sensor 1 may employ any of a variety of sensing technologies, including passive infrared (PIR), ultrasound (U/S), audio, video, microwave, and the like. In one non-limiting exemplary embodiment the light sensing element 26 is a digital PIR sensor. The light sensing element 28 may, in one non-limiting exemplary embodiment, be a 0-10V digital photosensor. As mentioned, the light sensing element could in some embodiments be configured to register the receipt of UV or IR light. The load 4 may include one or more incandescent bulbs, light emitting diodes (LEDs), or the like.

As previously noted, a user can employ a remote device 8 (shown in the illustrated embodiment as a smartphone) to set one or more configuration and/or operational parameters of the occupancy sensor. Once the wireless transceiver 24 of the occupancy sensor 1 is activated, the user may employ the remote device 8 to run a custom application ("App") 10 (FIG. 1) that includes an appropriate interface for enabling the user to remotely configure the occupancy sensor 1 in a desired manner.

In one non-limiting exemplary embodiment, the App may have a template, and the user may program each occupancy sensor 1 sequentially using that template. The template may include configuration settings for "an occupancy sensor" (e.g., time delay, sensitivity, default settings). The user may go from room to room, point to an occupancy sensor 1, pair with the occupancy sensor, and upload the default settings to the occupancy sensor. Multiple default templates, including any of a variety of groups of settings desirably for use with occupancy sensors, could be provided. The remote device 8 may be programmed once, and then the default or custom settings may be uploaded to the occupancy sensors one by one.

Figure 3:
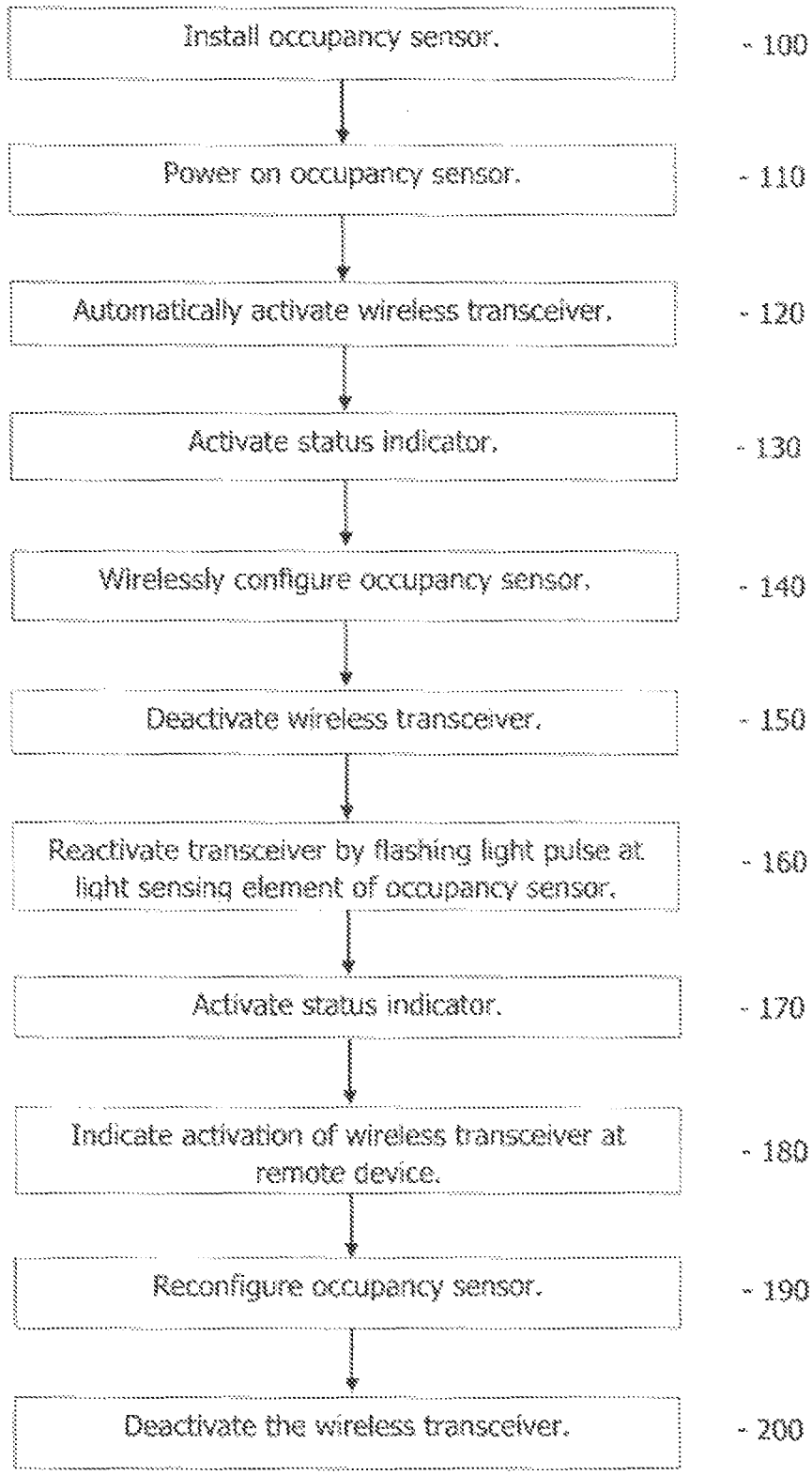
FIG. 3 is a flow diagram illustrating an exemplary embodiment of a method for implementing a system in accordance with the present disclosure.

Referring now to FIG. 3, a flow diagram illustrating an exemplary method according to the disclosure. It will be understood that the occupancy sensor 1 may be one of a plurality of occupancy sensors and that the method presented may be performed/repeated in a substantially similar manner for some or all of the occupancy sensors in the system 1.

At 100, the occupancy sensor 1 may be installed within a room of a building. For example, the occupancy sensor 1 may be installed on or in a ceiling or wall of the room. At 110, the occupancy sensor 1 may be connected to a source of power. In some embodiments, this may simply involve connecting the occupancy sensor to line power, or connecting the power pack 12 (coupled to the occupancy sensor 1) to line power 2. Once the occupancy sensor 1 has been powered on, the wireless transceiver 24 of the occupancy sensor 1 may, at 120, be automatically activated. In some embodiments this automatic activation is in response to a command from the sensor processor 20, for example. Thus, the occupancy sensor 1 may be configured so that the wireless transceiver 24 is active "out of the box." While the wireless transceiver 24 is active, the occupancy sensor 1 may be visible to other wireless devices, such as the remote device 8, which in embodiments may be a smartphone, tablet, laptop, etc. The occupancy sensor 1 may thus be available for wireless configuration using the remote device 8. Optionally, at 130, the status indicator 30 of the occupancy sensor 1 may be illuminated or may flash in a predetermined pattern while the wireless transceiver 24 is active.

At 140, the occupancy sensor 1 may be configured by a technician using the remote device 8. Once commissioning of the occupancy sensor 1 has been completed, the wireless transceiver 24 of the occupancy sensor may, at 150, be automatically deactivated to prevent tampering and to mitigate screen clutter on unrelated wireless remote devices (e.g., smartphones, tablets, laptops, etc.) that might otherwise detect and list the occupancy sensor 1 in a wireless connection menu. Optionally, the wireless transceiver 24 of the occupancy sensor 1 may be automatically deactivated after a predetermined amount of time if the occupancy sensor has not been commissioned. Further optionally, the wireless transceiver 24 may be manually deactivated by a user applying a light flash, light pulse or the like to the occupancy sensor's light sensing element 28. The processor 20 may be programmed to recognize such an input from the light sensing element 28 as a command to deactivate the wireless transceiver 24 and may act accordingly.

At 160, a technician may reactivate the wireless transceiver 24 of the occupancy sensor by providing a light pulse or a coded set of light pulses to the light sensing element 28 of the occupancy sensor 1. As mentioned, such reactivation may be desirable to enable reconfiguration of the occupancy sensor 1 via the remote device 8, such as a smartphone, tablet, laptop, etc. In some embodiments this may be achieved by a technician using a flashlight, laser pointer, or other appropriate light source in a manner previously described in relation to FIG. 2. Once the wireless transceiver 24 has been activated thusly, the status indicator 30 of the occupancy sensor 1 may, at 170, be illuminated or may flash in a predetermined pattern to indicate to a technician that reactivation of the wireless transceiver was successful. Additionally, the remote device 8 may, at 180, display an indication that the wireless transceiver 24 of the occupancy sensor 1 has been activated.

At 190, the occupancy sensor 1 may be reconfigured by a technician using the remote device 8 in a manner similar to the configuration performed in 140 above. At 200 the wireless transceiver 24 may be automatically deactivated. Optionally, the wireless transceiver 24 be automatically deactivated after a predetermined amount of time if the occupancy sensor 1 has not been reconfigured or if otherwise the wireless transceiver 24 has not received any wireless messages from the remote device 8. Alternatively, the wireless transceiver 24 may be manually deactivated in one or more of the manners previously described.

Figure 4:
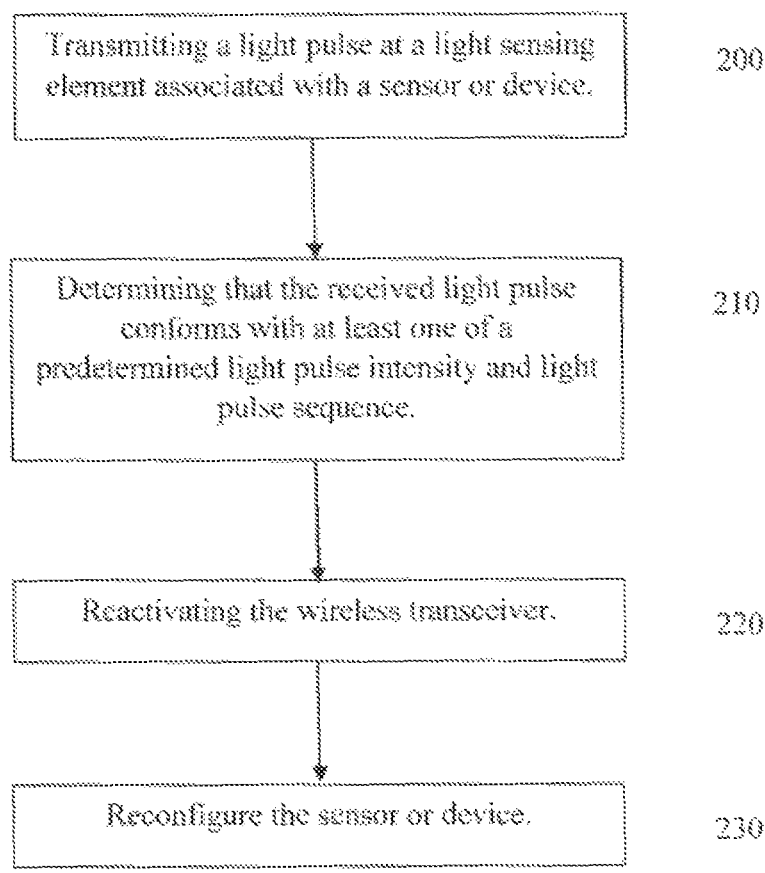
FIG. 4 is an alternate flow diagram illustrating an exemplary embodiment of a method for implementing a system in accordance with the present disclosure.

FIG. 3 illustrates an exemplary method for a newly installed occupancy sensor 1. It will be understood that one or more steps may be optional and not necessary. For example, FIG. 4 illustrates an exemplary method for re-activating a previously installed sensor or device such as may be required if a technician needs or wants to make one or more changes to a previously commissioned sensor.

At 200, a light pulse may be transmitted to the sensor or device from a remote device. For example, the technician may transmit a light pulse at a light sensing element associated with the sensor or device. At 210, the sensor or device receives the light pulse and determines that the received light pulse conforms with at least one of a predetermined light pulse intensity and light pulse sequence. At 220, the sensor or device reactivates the wireless transceiver (e.g., turn ON) of the sensor so that, for example, at 240, the technician may reconfigure the sensor or device using the remote device 8.

The sensor or device may also activate a visual status indicator associated with the sensor or the remote device, the visual status indicator indicating an active or ON state of the wireless transceiver. The sensor or device may also activate the wireless transceiver for a predetermined period of time, at the expiration of which the wireless transceiver may automatically deactivate.

One of ordinary skill in the art will appreciate that any number or sequence of steps may be utilized to activate (e.g., turn ON the wireless transceiver) and deactivate (e.g., turn OFF the wireless transceiver) the wireless transceiver inside of the load control device (e.g., sensor, photocell, etc.).

In view of the present disclosure, it will be appreciated that the above-described occupancy sensor 1 and associated method allow a technician to activate (e.g., turn ON the wireless transceiver) and, optionally, deactivate a wireless transceiver (e.g., turn OFF the wireless transceiver) of an occupancy sensor using a portable light source without requiring the technician to physically access the occupancy sensor. This may provide a significant time savings and a reduction in labor relative to conventional systems in which a technician is required to employ a ladder, lift, or other assistive device to access occupancy sensors that are installed in hard-to-reach locations. Additionally, the system and method of the present disclosure preferably requires a technician to be in the immediate vicinity of the occupancy sensor (e.g., in the same room as the occupancy sensor) when reactivation is performed, thereby preventing remote tampering with an occupancy sensor and avoiding confusion between occupancy sensors.

Some embodiments of the disclosed system and method may be implemented, for example, using a storage medium, a computer-readable medium or an article of manufacture which may store an instruction or a set of instructions that, if executed by a machine (i.e., processor or microcontroller), may cause the machine to perform a method and/or operations in accordance with embodiments of the disclosure. By way of example, such a machine may include, but not limited to, any suitable processing platform, computing platform, computing, processing, computing system, processing system, computer, processor, or the like, and may be implemented using any suitable combination of hardware and/or software. The computer-readable medium or article may include, but not limited to, any suitable type of memory unit, memory, memory article, memory medium, storage, storage article, storage medium and/or storage unit, for example, memory (including, but not limited to, non-transitory memory), removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

While certain embodiments of the disclosure have been described herein, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision additional modifications, features, and advantages within the scope and spirit of the claims appended hereto.

What is claimed is:

1. An occupancy sensor comprising:
   an occupancy sensing element for detecting an object within an area of coverage;
   a light sensing element for detecting light within the area of coverage;
   a wireless transceiver configured for wireless communication with a remote device; and
   one or more processors, each of said processors coupled to at least one of the occupancy sensing element, the light sensing element and the wireless transceiver, the one or more processors adapted and configured to control at least one load in response to output from the occupancy sensing element and light sensing element;
   wherein when the light sensing element senses a predetermined light signal, the one or more processors activates or deactivates the wireless transceiver without affecting operation of the occupancy sensor, the predetermined light signal comprising at least one of a predetermined light pulse, a predetermined number of light pulses, and a predetermined frequency of light pulses.

2. The occupancy sensor of claim 1, wherein the one or more processors are programmed to activate the wireless transceiver when the occupancy sensor is powered up.

3. The occupancy sensor of claim 2, wherein the one or more processors are programmed to deactivate the wireless transceiver as a step subsequent to configuration of the occupancy sensor using the remote device.

4. The occupancy sensor of claim 1, wherein the wireless transceiver comprises a Bluetooth radio.

5. The occupancy sensor of claim 1, wherein the occupancy sensor includes a status indicator for providing a visual indication when the wireless transceiver is active.

6. The occupancy sensor of claim 1, wherein the one or more processors is a single processor that is coupled to the occupancy sensing element, the light sensing element and the wireless transceiver, the processor programmed to at least one of activate and deactivate the wireless transceiver when the light sensing element senses a predetermined light signal.

7. An occupancy sensor comprising:
   an occupancy sensing element for detecting an object within an area of coverage;
   a light sensing element for detecting light within the area of coverage;
   a wireless transceiver configured for wireless coupling of the occupancy sensor to a remote device; and
   one or more processors, each of said processors coupled to at least one of the occupancy sensing element, the light sensing element and the wireless transceiver, wherein when the one or more processors receive a signal from the light sensing element indicating that the light sensing element has been exposed to a predetermined light signal, the predetermined light signal being at least one of: (1) a light having a predetermined intensity, and (2) a predetermined set of light pulses, the processor activates the wireless transceiver.

8. The occupancy sensor of claim 7, wherein the one or more processors are programmed to activate the wireless transceiver when the occupancy sensor is powered up.

9. The occupancy sensor of claim 8, wherein the one or more processors are programmed to deactivate the wireless transceiver as a step subsequent to configuration of the occupancy sensor using the remote device.

10. The occupancy sensing system of claim 8, wherein the wireless transceiver comprises a Bluetooth radio.

11. The occupancy sensor of claim 7, wherein the occupancy sensor further includes a status indicator for visually indicating when the wireless transceiver is active.

12. The occupancy sensor of claim 7, wherein the one or more processors are programmed to activate the wireless transceiver in response to the light sensing element being exposed to a coded set of flashed light pulses.

13. The occupancy sensor of claim 7, wherein the predetermined set of light pulses comprise a predetermined number of light pulses or a predetermined frequency of light pulses.

14. A method for activating a wireless transceiver of an occupancy sensor, the method comprising:
   receiving, at a light sensing element associated with an occupancy sensor, a predetermined light pulse;
   determining, by a processor associated with the light sensing element, that the received light pulse conforms with at least one of a predetermined light pulse intensity and light pulse sequence; and activating the wireless transceiver of the occupancy sensor when the received light pulse conforms with the predetermined light pulse intensity or the predetermined light pulse sequence, the predetermined light pulse sequence comprises at least one of a predetermined number of light pulses, and a predetermined frequency of light pulses.

15. The method of claim 14, further comprising activating a visual status indicator associated with the occupancy sensor, the visual status indicator identifying an active state of the wireless transceiver.

16. The method of claim 14, further comprising deactivating the wireless transceiver when the wireless transceiver does not receive a wireless signal within a predetermined time period.

17. The method of claim 14, wherein activating the wireless transceiver comprises activating the wireless transceiver for a predetermined period of time, at the expiration of which the wireless transceiver is automatically deactivated.

18. A load control device comprising:
a light sensing element for detecting light within an area of coverage;
a wireless transceiver configured for wireless communication with a remote device; and
one or more processors, each of said processors coupled to at least one of the light sensing element and the wireless transceiver;
wherein when the light sensing element senses a predetermined light signal, the one or more processors activate or deactivate the wireless transceiver, the predetermined light signal comprising at least one of a predetermined light pulse, a predetermined number of light pulses, and a predetermined frequency of light pulses.

* * * * *